United States Patent [19]
Nielsen

[11] Patent Number: 5,803,531
[45] Date of Patent: Sep. 8, 1998

[54] LINER SYSTEM FOR A HAULING COMPARTMENT

[76] Inventor: Jack T. Nielsen, 3330 S. 8000 West, Magna, Utah 84044

[21] Appl. No.: 861,377

[22] Filed: May 21, 1997

[51] Int. Cl.[6] ............................................. B60P 3/00
[52] U.S. Cl. ......................... 296/184; 105/422; 105/423
[58] Field of Search .................... 105/422, 423; 296/183, 184, 39.1, 39.2; 298/1 B

[56] References Cited

U.S. PATENT DOCUMENTS

| | | | |
|---|---|---|---|
| 397,420 | 2/1889 | Everit . | |
| 1,375,988 | 4/1921 | Walker . | |
| 2,773,718 | 12/1956 | Bohlen | 296/28 |
| 3,363,933 | 1/1968 | Wilson | 296/28 |
| 3,595,175 | 7/1971 | Austill | 105/243 |
| 3,912,325 | 10/1975 | Sudyk | 105/423 X |
| 4,188,058 | 2/1980 | Resa | 296/208 |
| 4,893,568 | 1/1990 | Adams | 105/416 |
| 4,917,429 | 4/1990 | Giger | 296/37.6 |
| 4,990,049 | 2/1991 | Hargrove | 414/537 |
| 5,131,709 | 7/1992 | Spica | 296/39.2 |
| 5,185,980 | 2/1993 | Rydberg et al. | 52/506 |
| 5,330,227 | 7/1994 | Anderson | 280/759 |
| 5,551,742 | 9/1996 | Martindale | 296/39.2 |
| 5,597,194 | 1/1997 | Daugherty | 296/39.2 |
| 5,599,055 | 2/1997 | Brown | 296/39.2 |

FOREIGN PATENT DOCUMENTS

| | | | |
|---|---|---|---|
| 1044063 | 11/1953 | France | 105/423 |
| 1255472 | 1/1961 | France | 105/422 |
| 1516406 | 10/1989 | U.S.S.R. | 105/422 |

*Primary Examiner*—Janice L. Krizek
*Attorney, Agent, or Firm*—Foster & Foster

[57] ABSTRACT

A liner system for a hauling compartment includes a containment structure defining a plurality of holding areas. A buffer material is introduced into the holding areas to act as an impact wear surface to prevent haul material from directly contacting the surface of the hauling compartment. Upon articulation of the hauling compartment to empty haul material from the compartment, the buffer material is held within the holding areas by means of the containment structure.

20 Claims, 4 Drawing Sheets

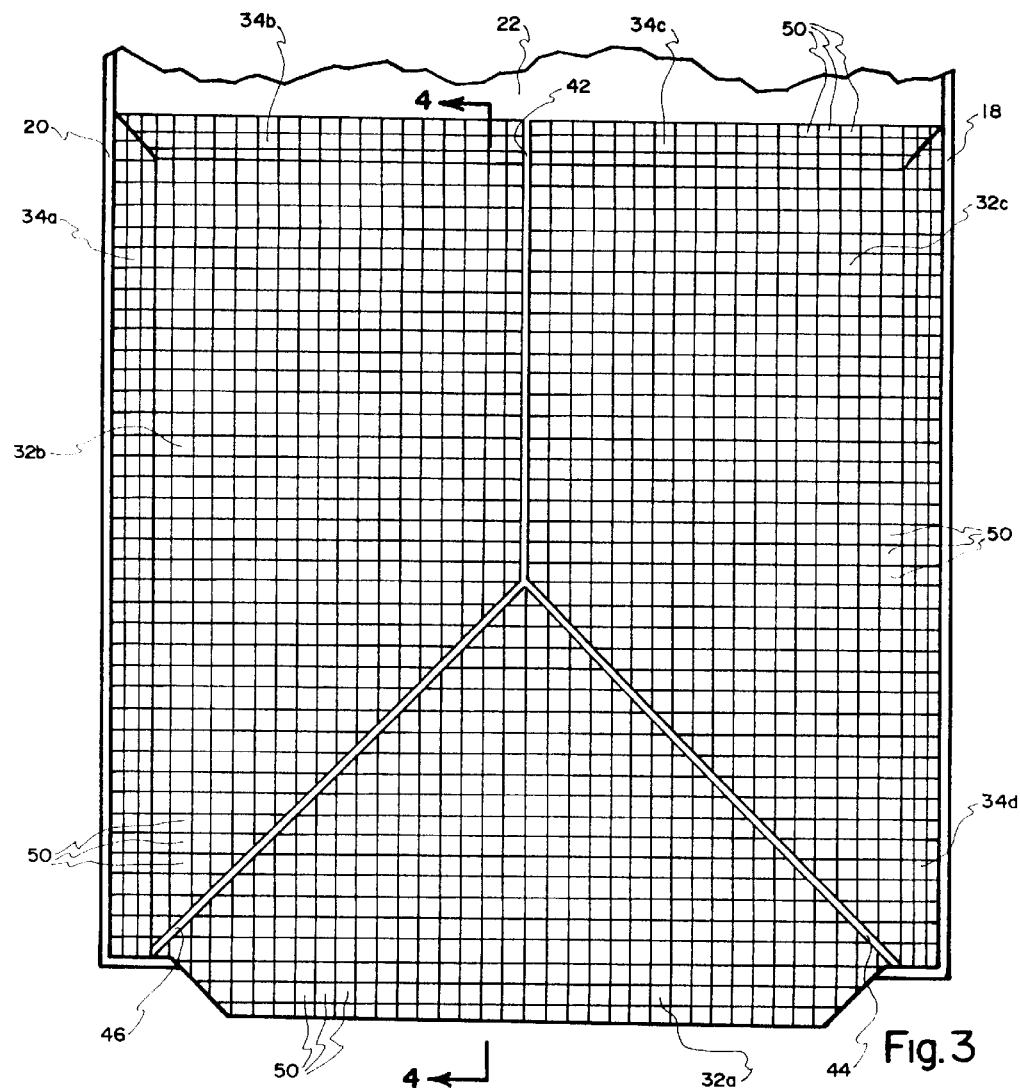
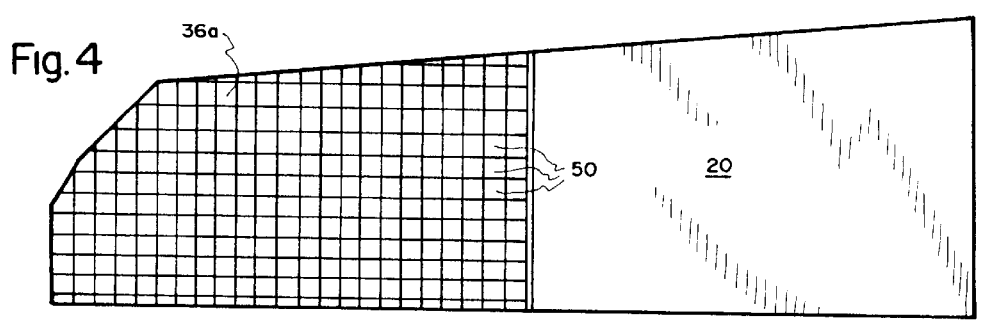

5,803,531

LINER SYSTEM FOR A HAULING COMPARTMENT

TECHNICAL FIELD

This invention relates to liners for hauling compartments, and more particularly, to liner systems for materials handling equipment such as dump trucks.

BACKGROUND OF THE INVENTION

Equipment for the handling of materials continues to assume an ever-increasing role in many specific applications, such as mining, where profitability depends upon the most efficient handling systems. Efforts have continually been made to upgrade and improve materials handling equipment so that its life and efficiency are increased.

A primary problem in materials handling systems relates to wear on the surfaces of hauling compartments of equipment used to process and transport the material. Typically, the material to be hauled directly contacts several surfaces of the hauling compartment which, over time, deteriorate and require replacement.

As a specific example, when materials, such as rocks and ore, are hauled using a vehicle such as a dump truck, the materials are directly introduced into the bed of the dump truck by means of a conveyor belt or some type of handling equipment such as a front-end loader. These examples should not be limiting as there are many other ways of introducing materials into a hauling compartment. Irrespective of the method of introducing rock, gravel, ore and other materials into a hauling compartment, the problem of wear exists.

With respect to hauling trucks that have an articulable bed (i.e., dump trucks), one traditional manner of dealing with excessive wear of the truck bed has been to install an extra layer of steel. This has typically been in the form of three-quarter inch flat plate steel which is welded directly to the bed of the hauling vehicle. This traditional system creates numerous problems. For one, the weight of the three-quarter inch panels of steel adds tremendously to the weight of the vehicle, even when the bed is empty of haul material. This extra weight affects everything from fuel economy to longevity of the hauling equipment. Another problem with these prior bed liners is that once the three-quarter inch flat plate steel wears out, it must be removed, typically by using an air arch or other similar device. This necessitates significant vehicle down time and numerous hours of labor required to replace the steel panels.

In view of the foregoing, there is a need to provide a liner system for protecting a surface of a hauling compartment, such as a bed of a dump truck, from excessive wear due to hauling material. There is also a need to develop a liner system for the hauling compartment that extends the life of the liner system, costs less to replace, and reduces the weight of the hauling compartment as compared to conventional bed liners.

SUMMARY AND OBJECTS OF THE INVENTION

It is a primary object of the present invention to provide a liner system for the bed of a hauling compartment, such as a bed of a dump truck, to prevent (i.e., to reduce to a very low frequency, if not eliminate) wear on suraces of the hauling compartment resulting from transporting the haul material.

Another object of the present invention is to reduce the weight of a hauling compartment used for transporting haul material.

Yet another object of the present invention is to provide a liner system that utilizes a portion of the material being hauled to act as a buffer between new material being introduced into the hauling compartment and the interior surface of the hauling compartment to prevent direct contact between the surface of the hauling compartment and new material being introduced into the hauling compartment.

Still another object of the present invention is to provide a novel impact wear surface for materials handling equipment.

Yet another object of the present invention is to provide a liner system for a truck bed that will increase the life of the truck bed.

Another object of the invention is to provide a liner system for the bed of a vehicle that can be removed relatively easily as compared to prior art bed liner systems.

Still another object of the present invention is to create an impact wear surface on the inside of a hauling compartment created by the material being hauled itself.

These and other objects of the invention are achieved by a liner system for a hauling compartment. The liner system is mounted to a surface of a hauling compartment, such as the bottom surface of a truck bed. The liner system comprises a web-like structure comprising a plurality of vertical walls forming a containment structure. The containment structure preferably comprises a plurality of holding areas. The holding areas are sized to hold aggregate buffer material of the same or of a similar type being transported in the hauling container. Upon articulation of the hauling compartment to empty its contents, the aggregate buffer material remains on the bottom surface of the bed because vertical walls of the web-like structure maintains the buffer material within the holding areas. When new material is introduced into the hauling compartment, such as a bed of a truck, the hauling material impacts the buffer material held within the web-like structure mounted to the bottom surface of the bed. Thus, a novel impact wear surface results which prevents wear on the surfaces of the hauling compartment.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 3 is a top view of the bed liner system of FIG. 2;

FIG. 4 is a partial left side elevation view, taken along the line 4—4 of FIG. 3 showing a side wall of the bed on which the liner system of the present invention has been installed;

DETAILED DESCRIPTION OF THE INVENTION

The present invention relates to liner systems for hauling compartments of materials handling equipment. The present invention is ideally suited for any type of materials handling equipment, including without limitation a conventional dump truck such as the one shown in FIG. 1. It is to be understood, however, that the present system may be used in connection with any hauling compartment in which materials to be hauled are introduced, including pick-up trucks, hauling trailers, and any other vehicle for hauling materials. The specific manner of transportation of the vehicles (e.g., self-propelled wheeled vehicles, rail cars, or other) is unimportant in connection with the present invention in that any one of these may be used. In addition, the specific material to be hauled may comprise virtually any type of material. The present invention is preferably directed toward materials handling vehicles capable of hauling rocks, ore, dirt, and the like, but the invention may be used in connection with hauling any other type of material.

Figure 1:
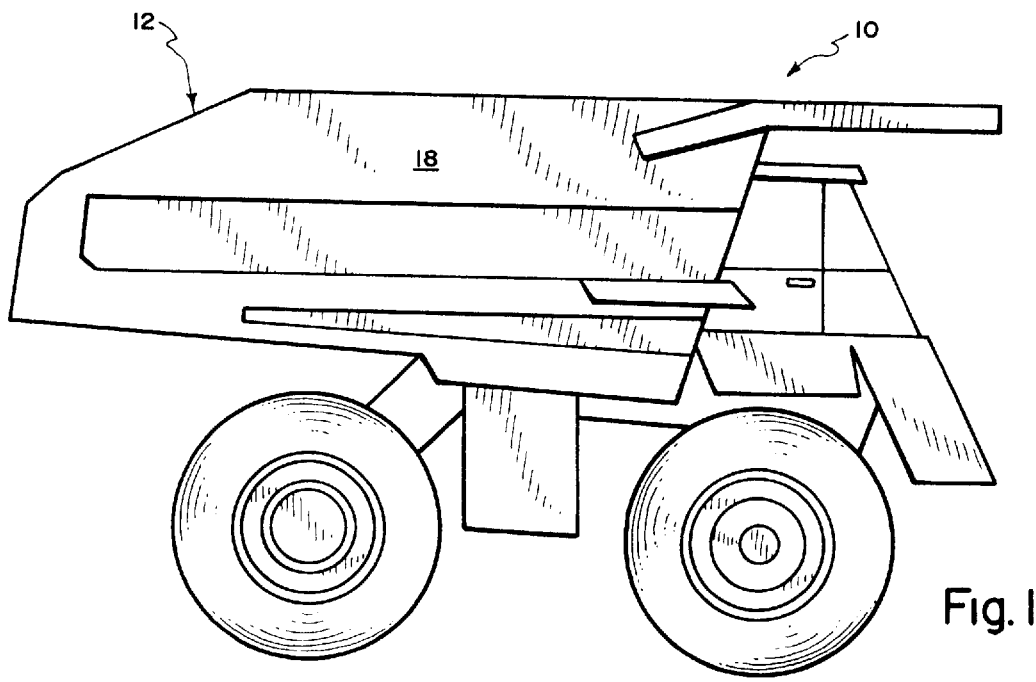
FIG. 1 is a side elevational view of a conventional piece of hauling equipment into which the present liner system may be installed.
Figure 2:
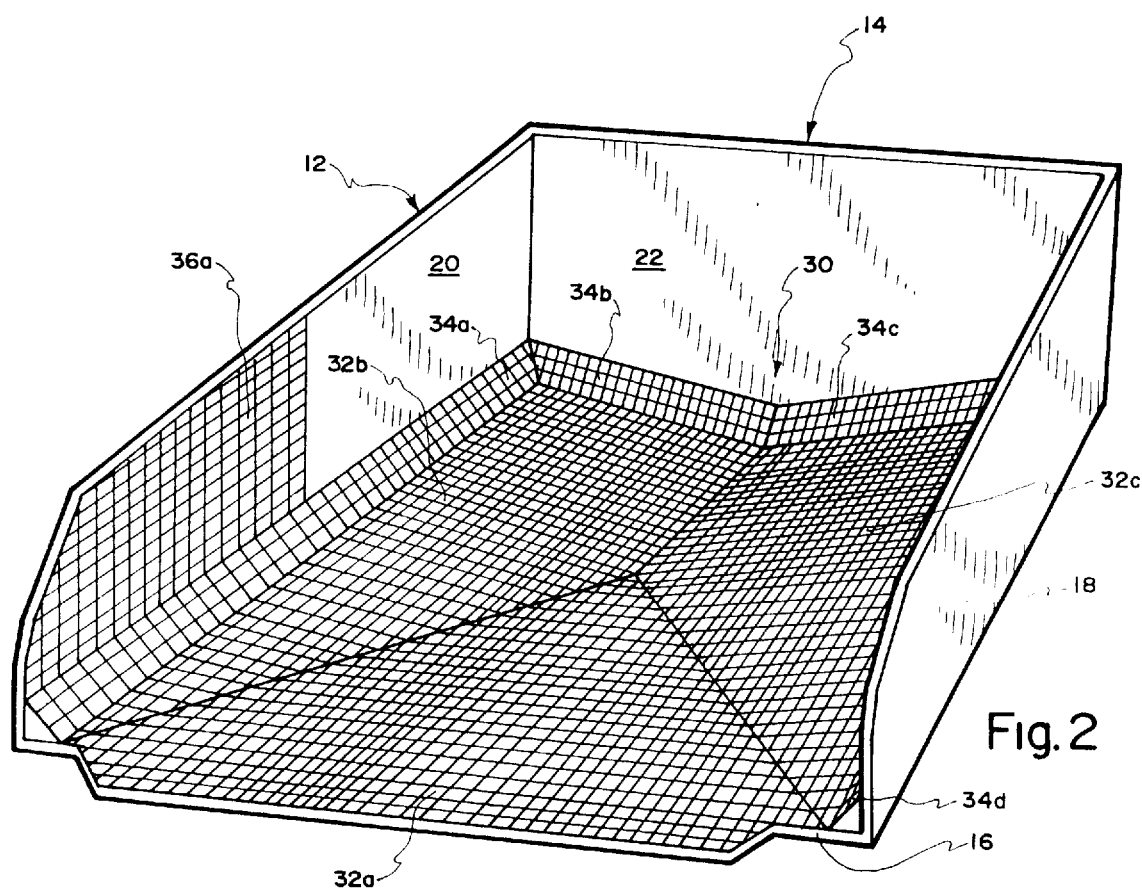
FIG. 2 is a perspective view of a bed of a hauling vehicle, such as the conventional dump truck of FIG. 1 in which the liner system of the present invention has been installed.

As shown in FIGS. 1 and 2, a conventional hauling vehicle 10 includes a hauling compartment 12 into which haul material (e.g., rocks, ore, dirt, and the like—not shown in FIGS. 1 or 2) is to be transported. The hauling compartment 12 shown in FIGS. 1 and 2 comprises a bed 14 having a bottom wall 16, side walls 18, 20, and a front wall 22. The bed 14 articulates relative to the rest of the vehicle to empty haul material from the bed. It is to be understood that this hauling compartment is merely representative of one of many hauling compartments that may be utilized in connection with the present invention. Although the detailed description of the invention that follows will be limited to a description of the dump truck bed 12 shown in FIGS. 1 and 2, the invention is not to be limited with respect to the specific size, type, or style of hauling compartment.

As shown in FIG. 2, an inventive liner system 30 is mounted to inner surfaces of the dump truck bed 14. The liner system 30 comprises a containment structure mounted to the inside bottom surface and portions of the inner side surfaces of the truck bed 14. The containment structure comprises a plurality of holding areas 66 (FIG. 5) formed by a web-like structure comprising vertical walls (62 and 64—see FIG. 5) interconnected one with another. Construction details of the web-like structure are discussed below. As shown in FIGS. 2–4, the liner system 30 comprises a containment structure in the form of three different panel types for areas on the inside of the truck bed: bottom surface panels 32a, 32b, and 32c, transition panels 34a, 34b, 34c, and 34d, and side wall panels 36a and 36b (panel 36b is a mirror-image of panel 36a shown in FIGS. 2 and 4, but panel 36b is not shown in the drawings).

With reference to FIGS. 3 and 4, the containment structure (which comprises in the preferred embodiment all of the bottom or floor panels 32, transition panels 34, and side wall panels 36—collectively referred to hereinafter as "the containment structure 36") comprises a web-like structure comprising vertical walls interconnected one with another. The web-like structure covers substantially an entire bottom surface of the hauling compartment. In addition, the transition sections 34a, 34b, 34c, and 34d extend across all of the inside corners formed between the bottom wall 16 and side walls 18, 20, 22 of the bed 14. The transition sections 34 form an angle between the bottom wall 16 and the side walls 18, 20, and 22. Side wall panels 36a and 36b are installed so as to cover the rearward portions of the side walls 18 and 20, respectively. Approximately the last fourteen and one-half feet of the side walls 18, 20 are covered by panels 36a and 36b.

As shown in FIGS. 3, the bottom wall sections 32a, 32b, and 32c are mounted to the bottom wall 16 of the truck bed so that expansion areas 42, 44, and 46 are created between the three containment structures. Preferably, the expansion areas should be between ¾" to approximately 2¼".

As shown in FIGS. 2–4, the containment structure comprises a plurality of vertical walls interconnected one with another to form a plurality of generally rectangular shaped holding areas 50. The generally rectangular holding areas 50 are truncated at the expansion areas 42, 44, and 46 as well as on the peripheral edges of side panels 36a, 36b to form triangularly shaped holding areas. Diagonally placed rails (not shown in detail) terminate angled edges of sections 32a, 32b, 32c. It is to be understood that virtually any size or shape of surface can be covered with the containment structure of the present invention.

Figure 5:
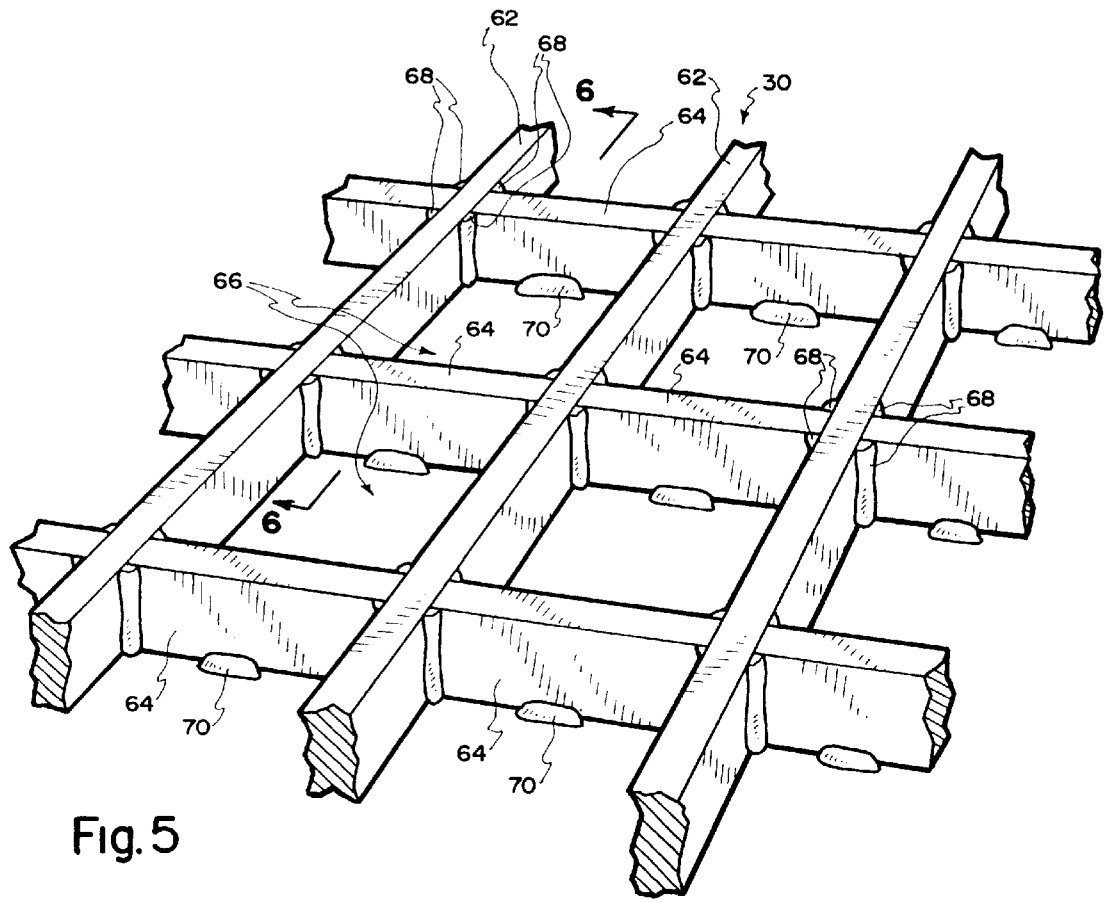
FIG. 5 is an enlarged perspective view of a web-like structure comprising a portion of the bed liner system according to the present invention.
Figure 6:
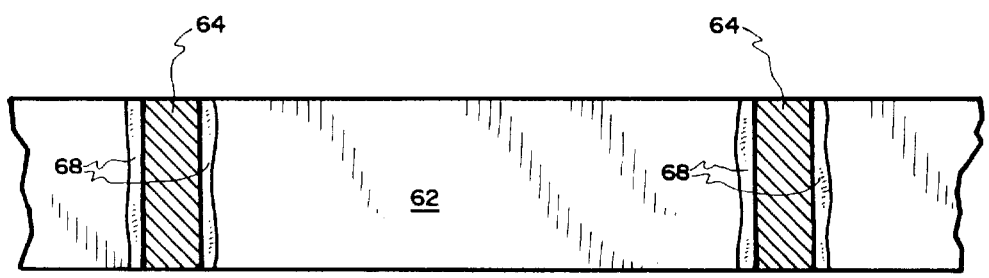
FIG. 6 is a sectional side elevation view, taken along the line 6—6 of FIG. 5, of the web-like structure shown in FIG. 5.
Figure 7:
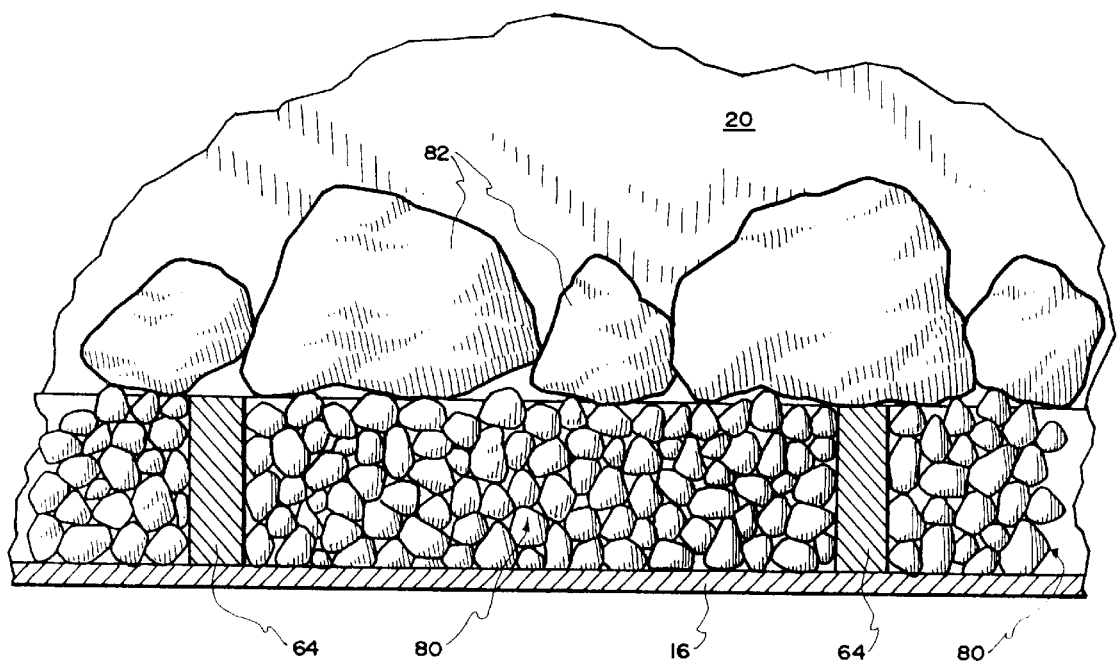
FIG. 7 is a sectional side elevation view of the liner system according to the present invention mounted inside a bed of a hauling compartment with aggregate buffer material being held within the holding areas of the containment structure.

Details of the containment structure 30 are shown and described in FIGS. 5–7. A typical containment structure 30 is shown wherein a plurality of longitudinal rails 62 are interconnected by cross pieces 64. The result is the formation of multiple holding areas 66. The cross pieces 64 are secured to the longitudinal rails by means of a plurality of conventional welds 68. The entire web-like containment structure is secured to the bed of a hauling container by means of yet additional welds 70. Welds 70 are preferably made between the particular surface to which the panel is being attached and the cross pieces 64, rather than the longitudinal rails 62.

In a preferred embodiment, the containment areas 66 are 6"×6", each having a depth of approximately 1½". The rails 62 and cross pieces 64 are preferably made of 1"×1½" steel.

Referring back to FIGS. 3 and 4, the liner system is installed onto the bed of a truck by first placing panels 32b and 32c on the bottom of the truck, with panel 32a following thereafter. If the panels 32a, 32b, and 32c are to be constructed using subassemblies, the construction should be from the inside, working toward the outside, and from the front of the bed, toward the back. After the bottom wall sections 32a, 32b, and 32c have been installed, transition sections 34a, 34b, and 34c should be installed. The side wall sections 36a and 36b should be installed next.

Figure 8:
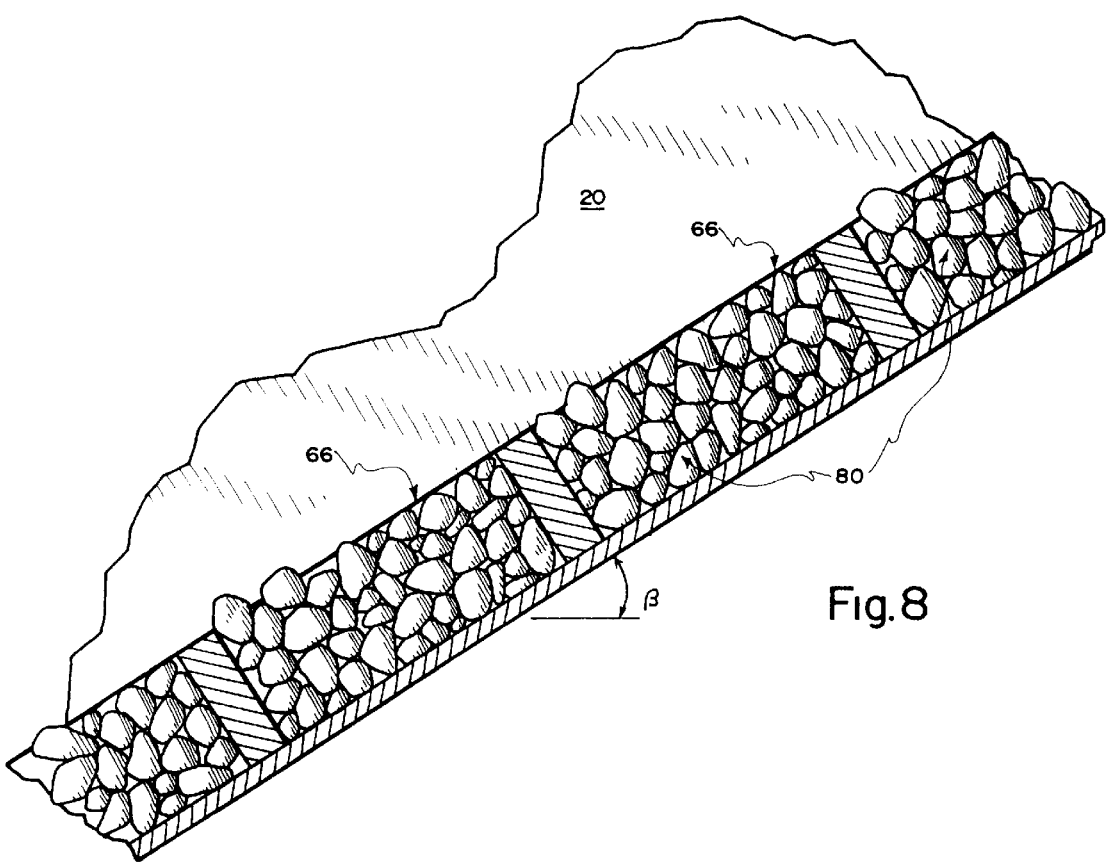
FIG. 8 is a sectional side elevation view, inclined relative to the depiction of FIG. 7, showing the aggregate buffer material being maintained within the holding areas of the containment structure upon articulation of the bed.

Referring to FIGS. 7 and 8, after the containment structure 30 has been installed to the bed of a hauling compartment, such as the bed of a dump truck, implementation of the liner system can be by one of two ways. First, a buffer material 80 may be introduced into the plurality of holding areas 66. Preferably, the buffer material will comprise aggregate material that is relatively small so that most of the volume within the holding areas is filled by the buffer material 80. Thereafter, haul material 82 may be introduced on top of the buffer material. In this manner, the buffer material 80 serves as an impact wear surface to prevent direct contact between the haul material 82 and the bottom wall 16 of the truck bed.

When the haul material 82 is to be removed from the hauling container, the hauling container or truck bed is articulated so that it is inclined at an angle β relative to the horizontal. As is shown in FIG. 8, the aggregate material 80 held within the holding area 66 remains in the holding area 66 according to an angle of repose, which will depend upon the particular buffer material 80 being used.

As an alternative to the above-described method of introducing a buffer material 80 into the holding areas 66, the newly-installed containment structure 30 may simply be used in connection with the material to be hauled. The fines of the material being hauled will necessarily settle into the holding areas 66 and form the aggregate buffer material which will eventually form the impact wear surface.

There are many advantages of the inventive liner system for a hauling compartment as described above. A significant benefit relates to a reduction in weight of the truck bed when the haul material has been emptied. Even though in the present invention the buffer material will remain in the bed of the truck, this material is typically much lighter than an entire extra layer of a ¾" steel panel, which has heretofore been used in connection with conventional dump trucks. Another major benefit relates to the decrease in wear to the liner system itself. Since the haul material itself acts as an impact wear surface, there is no appreciable wear experienced by the truck bed itself. The degree of wear to the liner system is also far less than that experienced by the plates of steel installed on conventional haul trucks.

Yet another advantage of the present invention relates to the ease of removing a liner system and replacing it with a new liner system. A conventional extra plate of ¾" steel will require enormous down time for the vehicle and significant man hours to remove the flat plates of steel. This typically requires an air arch removal process. With respect to the present invention, the plurality of welds 70 (see FIG. 5) are simply removed and entire sections of the liner system 30 can be lifted out of the vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

I claim:

1. A system for lining the bed of a hauling compartment, comprising:
    a containment structure adapted to be secured to a surface of the compartment for hauling material;
    a plurality of holding areas formed in a particular plane in the containment structure, the holding areas being formed by a plurality of upstanding walls, the upstanding walls intersecting one another in the particular plane to define respective holding areas, the holding areas being bounded on all sides by the upstanding walls, the respective holding areas having a depth and a cross sectional area;
    wherein the holding areas are adapted to contain a buffer material, the buffer material providing an impact wear surface to minimize direct contact between the surface of the hauling compartment and haul material being introduced into the hauling compartment.

2. A system for lining the bed of a hauling compartment according to claim 1 wherein the depth of the respective holding areas defined by the containment structure is sufficient to hold buffer material when the hauling compartment is inclined to empty the haul material from the hauling compartment.

3. A system for lining the bed of a hauling compartment according to claim 1 wherein the buffer material comprises haul material.

4. A system for lining the bed of a hauling compartment according to claim 1 wherein the buffer material comprises haul material comprising varying sized aggregate material.

5. A system for lining the bed of a hauling compartment according to claim 1 wherein the hauling compartment comprises a bed of a pickup truck.

6. A system for lining the bed of a hauling compartment according to claim 1 wherein the hauling compartment comprises a bed of a dump truck.

7. A system for lining the bed of a hauling compartment according to claim 1 wherein the hauling compartment comprises a trailer.

8. A system for lining the bed of a hauling compartment according to claim 1 wherein the containment structure comprises a web-like structure such that the upstanding walls are interconnected one with another, the web-like structure covering an entire bottom surface of the hauling compartment.

9. A system for lining the bed of a hauling compartment according to claim 1 wherein the containment structure comprises a web-like structure such that the upstanding walls are interconnected one with another, the web-like structure comprising rectangularly shaped holding areas, the web-like structure covering substantially an entire bottom surface of the hauling compartment.

10. A system for lining the bed of a hauling compartment according to claim 1 wherein the containment structure comprises a web-like structure such that the upstanding walls are interconnected one with another, the web-like structure comprising a plurality of generally rectangular and triangular shaped holding areas.

11. A liner system for truck beds, comprising:
    a containment structure adapted to be secured to a bed of a truck for hauling material;
    a plurality of holding areas formed in a particular plane in the containment structure, the holding areas defined by a plurality of vertical walls completely surrounding the holding areas, the vertical walls intersecting one another in the particular plane to define respective holding areas, the respective holding areas having a depth and
    a cross sectional area;
    a buffer material held within the holding areas, the buffer material providing an impact wear surface to absorb the impact from haul material being introduced into the truck bed and minimize direct contact between the surface of the truck bed and haul material being introduced into the truck bed.

12. A liner system for truck beds according to claim 11 wherein the depth of the respective holding areas defined by the containment structure is sufficient to hold buffer material when the truck bed is inclined to empty the haul material from the truck bed.

13. A liner system for truck beds according to claim 11 wherein the buffer material comprises haul material.

14. A liner system for truck beds according to claim 11 wherein the buffer material comprises haul material comprising varying sized aggregate material.

15. A liner system for truck beds according to claim 11 wherein the containment structure comprises a web-like structure comprising a plurality of vertical walls interconnected one with another, the web-like structure covering an entire bottom surface of the truck bed.

16. A liner system for truck beds according to claim 11 wherein the containment structure comprises a web-like structure comprising a plurality of vertical walls interconnected with one another forming a plurality of individual compartments, the plurality of compartments covering the majority of a bottom surface of the truck bed.

17. A liner system for truck beds according to claim 11 wherein the containment structure comprises a web-like structure such that the plurality of vertical walls are interconnected with one another, the web-like structure forming a plurality of rectangular shaped holding compartments.

18. A method of providing a wear surface for a hauling container, comprising the steps of:

providing a hauling container having a surface, the hauling container adapted to carry haul material;

mounting a containment structure to the surface, the containment structure comprising a plurality of vertical walls defining a plurality of holding areas formed in a particular plane of the containment structure, the vertical walls intersecting one another in the particular plane to define respective holding areas, the holding areas being bounded on all sides by the vertical walls;

introducing a buffer material into holding areas of the containment structure, the buffer material engaging the vertical walls of the holding areas, the buffer material providing a wear surface to prevent direct contact between the surface of the hauling container and the haul material being introduced into the hauling container;

articulating the hauling container to empty the hauling container;

retaining a substantial portion of the buffer material within the holding areas.

19. The method of claim 18 wherein the step of introducing a buffer material comprises introducing haul material into holding areas of the containment structure.

20. The method of claim 18 wherein the step of retaining the buffer material within the holding areas depends upon the angle of repose of the buffer material.

* * * * *